United States Patent [19]

Schwartz et al.

[11] 4,433,118

[45] Feb. 21, 1984

[54] POLY (P- AND M-METHYLENEBENZOATE) BLENDS WITH POLYARYLATES

[75] Inventors: Michael M. Schwartz, Aurora; Jack R. Knox, Naperville; Edward E. Paschke, Wheaton, all of Ill.

[73] Assignee: Standard Oil Company (Indiana), Chicago, Ill.

[21] Appl. No.: 424,854

[22] Filed: Sep. 27, 1982

Related U.S. Application Data

[63] Continuation-in-part of Ser. No. 301,362, Sep. 11, 1981, abandoned.

[51] Int. Cl.$^3$ .................... C08L 67/02; C08L 67/00
[52] U.S. Cl. .................... 525/437; 525/450
[58] Field of Search ................ 525/437, 450

[56] References Cited

U.S. PATENT DOCUMENTS

| | | | |
|---|---|---|---|
| 3,133,898 | 5/1964 | Keck | 528/194 |
| 3,317,464 | 5/1967 | Conix | 528/176 |
| 3,780,148 | 12/1973 | Jackson et al. | 528/173 |
| 3,824,213 | 7/1974 | Stackman | 528/174 |
| 3,884,990 | 5/1975 | Sakata et al. | 525/437 |
| 3,948,856 | 4/1976 | Stackman | 528/194 |
| 4,130,719 | 12/1978 | Cerefice et al. | 528/305 |
| 4,246,381 | 1/1981 | Robeson | 525/444 |
| 4,250,279 | 2/1981 | Robeson et al. | 525/425 |

FOREIGN PATENT DOCUMENTS 1002545 8/1965 United Kingdom .

*Primary Examiner*—Wilbert J. Briggs, Sr.
*Attorney, Agent, or Firm*—William C. Clarke; William T. McClain; William H. Magidson

[57] ABSTRACT

Compositions comprising a blend of a polyarylate and a poly(methylenebenzoate) wherein said polyarylate is derived from a dihydric phenol and an aromatic dicarboxylic acid, said poly(methylenebenzoate) comprises poly(p-methylenebenzoate), poly(m-methylenebenzoate) and mixtures thereof. These compositions have improved processability relative to the polyarylate, have improved weatherability relative to the poly(methylenebenzoate) and are transparent.

13 Claims, No Drawings

POLY (P- AND M-METHYLENEBENZOATE) BLENDS WITH POLYARYLATES

This is a continuation-in-part of application Ser. No. 301,362, filed Sept. 11, 1981 and now abandoned.

BACKGROUND OF THE INVENTION

The field of this invention relates to a composition comprising a blend of a polyarylate with a poly(p-methylenebenzoate) (PPMB), a poly(m-methylenebenzoate) (PMMB), or mixtures thereof. These compositions have improved processability relative to the polyarylate and improved weatherability relative to the PPMB or PMMB. The compositions of this invention comprise a polyarylate derived from a dihydric phenol and an aromatic dicarboxylic acid, and PPMB, or PMMB, or mixtures thereof. The thermoplastic blends can be easily molded by injection or vacuum forming techniques or by extrusion to form a large variety of useful shaped articles.

Polyarylates are aromatic polyesters derived from a dihydric phenol, particularly 2,2-bis(4-hydroxyphenyl)-propane (also identified as Bisphenol-A) and an aromatic dicarboxylic acid, particularly mixtures of terephthalic and isophthalic acids.

Polyarylates are high temperature, high performance thermoplastic polymers with a good combination of thermal and mechanical properties. They have a high, continuous use temperature of about 130° C., and good unnotched toughness, with a pendulum impact value of greater than 300 ft.-lbs./in.$^3$. Additionally, polyarylates have inherent flammability and combustion resistance. The polyarylates have good color retention. They also have good processability which allows them to be molded into a variety of articles. However, processing of polyarylates is by injection molding or extrusion at temperatures greater than about 330° C. These high processing temperatures can require the use of special equipment, such as heated molds. Thus, it is desirable to improve the processability of polyarylates.

Poly(p- and m-methylenebenzoate) polyesters suitable for manufacture of useful textile fibers are derivatives of p- and m-hydroxymethylbenzoic acid, the methylester and polymers disclosed in U.S. Pat. No. 4,130,719, which is incorporated herein by reference. A similar procedure can be used to prepare ethyl and higher analogues.

Poly(p- and m-methylenebenzoate) polyesters are high molecular weight polymers having vastly improved properties over polymers previously known. This particular polymer is a normally amorphous polymer, has excellent impact strength and solvent resistance, and is characterized by an inherent viscosity from 0.4 to 2.0 dl/g. It is particularly useful as an engineering plastic but can be used in other applications as well.

It has been unexpectedly found that the addition of PPMB or PMMB, or mixtures thereof, to a polyarylate improves the processability of the polyarylate in that it increases melt flow. This allows lowering of the melt temperature and of the mold temperature which allows for faster cycle time in injection molding.

Polyarylates have good weatherability, i.e., the retain their mechanical properties after exposure to conditions to ultraviolet light and moisture. In contrast, the weatherability of poly(p- and m-methylenebenzoate) polymers is generally poor since they lose their impact properties upon exposure to ultraviolet light. Use of typical ultraviolet stabilizers only marginally improves the stability of PPMB, PMMB, or mixtures thereof. Therefore, it was unexpected that the addition of a polyarylate, even in small amounts, to PPMB, PMMB, or mixtures thereof results in a composition having improved weatherability.

Additionally, polymer blends, even those comprising transparent polymeric materials, usually yield an opaque composition due to incompatibility of the components. The blends of polyarylate and PPMB, PMMB, or mixtures thereof when combined in all proportions yield transparent compositions which exhibit a single glass transition temperature and can be molded into useful articles.

British Pat. No. 1,002,545 describes a blend wherein one of the components is a polyester of terephthalic acid and one or more aliphatic diols, and the other component is a polyarylate of 2,2-di(4-hydroxyphenyl)-propane and terephthalic and isophthalic acid, the ratio of terephthalate residues to isophthalate residues in the copolyester ranging from 90:10 to 10:90.

The British patent describes that the blend of the polyester and polyarylate provides an easily moldable polymer blend without the disadvantages attendant when molding each of the two components alone. The examples of the British patent describe a blend of poly(ethyleneterephthalate) and a polyarylate of 2,2-di(4-hydroxyphenyl)propane and isophthalic and terephthalic acid. The British patent states that the aliphatic diol from which the polyester is derived may be cycloaliphatic, such as 1,4-di(hydroxymethyl)cyclohexane.

U.S. Pat. No. 4,246,381 to Robeson describes a blend of copolyester derived from a cyclohexanedimethanol, and alkylene glycol and an aromatic dicarboxylic acid and a polyarylate derived from a dihydric phenol and an aromatic dicarboxylic acid. The blend is described as having improved processability relative to the polyarylate and improved weatherability, impact properties and heat distortion temperature relative to the copolyester.

U.S. Pat. No. 4,250,279 to Robeson, et al., describes molding compositions of blends of a polyarylate derived from a dihydric phenol and an aromatic dicarboxylic acid, and a polyetherimide. The blends are described as having improved environmental stress crack resistance relative to the polyarylate and improved impact strength relative to the polyetherimide. The compositions containing polyetherimide and polyarylate are described as having excellent mechanical compatibility and excellent mechanical properties.

British Pat. No. 1,002,545 and U.S. Pat. Nos. 4,246,381 and 4,250,279 do not suggest that easily moldable blends of a polyarylate of a dihydric phenol and an aromatic acid can be obtained by the addition of a poly(p-methylenebenzoate) polyester or a poly(m-methylenebenzoate) polyester or that the weatherability of poly(methylenebenzoate) polymers is improved by the addition of a polyarylate. British Pat. No. 1,002,545 does not suggest the blend of copolyesters and polyarylate has different impact properties than either component. U.S. Pat. No. 4,246,381 teaches that the impact strength of the copolyester is improved by the addition of polyarylate. In contrast, the tensile impact strength of poly(p-methylenebenzoate) and poly(m-methylenebenzoate) is decreased by the addition of polyarylate.

DESCRIPTION OF THE INVENTION

It has been found that the processability of a polyarylate derived from a dihydric phenol and an aromatic dicarboxylic acid can be improved by the addition of PPMB or PMMB, or mixtures thereof. Moreover, mixtures in all proportions of polyarylates and polyesters give transparent, compatible blends that exhibit a single glass transition temperature. This was unexpected since a blend of polycarbonate based on Bisphenol-A and phosgene and PPMB or PMMB, or a mixture thereof gave multiple glass transition temperatures. Additionally, it has further unexpectedly been found that the addition of polyarylate to PPMB, PMMB, or mixtures thereof results in a composition having improved weatherability in comparison to PPMB, PMMB, or mixtures thereof without polyarylate. This was unexpected since ultraviolet stabilizers or a model structure, Bisphenol-A dibenzoate, did not markedly improve the weatherability of PPMB, PMMB, or mixtures thereof.

The composition of this invention comprises an admixture of:

(a) a polyarylate derived from a dihydric phenol and an aromatic dicarboxylic acid, and
(b) PPMB or PMMB, or mixtures thereof.

The polyarylates of this invention are derived from a dihydric phenol and an aromatic dicarboxylic acid.

A particularly desirable dihydric phenol is of the following formula:

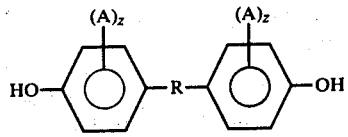

wherein A is independently selected from the group consisting of alkyl groups of 1 to 4 carbon atoms, cycloalkyl groups of 6 to 12 carbon atoms, aryl groups of 6 to 20 carbon atoms, chlorine and bromine; z is independently selected from the integers of from 0 to 4 inclusive, with the provision that when z is 0 the benzene ring is completed with a hydrogen atom; and R is a divalent saturated aliphatic hydrocarbon radical, particularly alkylene and alkylidene radicals, having from 1 to 16 carbon atoms, cycloalkylene and cycloalkylidene radicals having up to and including 9 carbon atoms, arylene radicals having from 6 to 20 carbon atoms and two divalent hydrocarbon radicals of from 6 to 20 carbon atoms joined directly or by stable linkages selected from the group consisting of —O—, methylene, —CO—, —SO$_2$—, and —S— radicals. The preferred dihydric phenol is Bisphenol-A. The dihydric phenols may be used individually or in combination. Additionally, said dihydric phenols can be used in combination with a dihydric phenol of the following formula:

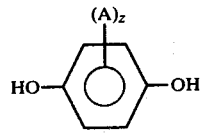

wherein A and z are as previously defined.

Suitable aromatic dicarboxylic acids are terephthalic acid, isophthalic acid, naphthalene dicarboxylic acids and mixtures thereof, as well as alkyl substituted homologs of these carboxylic acids wherein the alkyl groups contain from 1 to about 4 carbon atoms, and acids containing other inert substituents, such as halides, alkyl or aryl ethers, and the like.

Preferably, the polyarylates contain from about 95 to 0 mole percent of terephthalic acid and from about 5 to 100 mole percent of isophthalic acid. More preferably, the polyarylates contain a mixture of from about 30 to about 70 mole percent of terephthalic acid and from about 70 to about 30 mole percent of isophthalic acid. A polyarylate containing a mixture of 50 mole percent of terephthalic acid and 50 mole percent of isophthalic acid is most preferred.

The polyarylates of the present invention can be prepared by any of the well-known polyester forming reactions, such as by the reaction of the acid chlorides of the aromatic dicarboxylic acids with the dihydric phenol, the reaction of the diaryl esters of the aromatic dicarboxylic acids with the dihydric phenol, and the reaction of the aromatic diacids with diester derivatives of the dihydric phenol. These processes are described in, for example, U.S. Pat. Nos. 3,317,464; 3,948,856; 3,780,148; 3,824,213 and 3,133,898.

These polyarylates have a reduced viscosity of from about 0.4 to about 1.0 as measured in p-chlorophenol at 49° C. (0.2 g/100 ml).

The polyesters of this invention are poly(methylenebenzoates) and have the following formula:

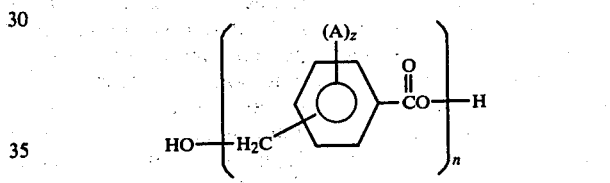

wherein A and z are as previously defined. The term n is an integer of from 10 to 1000 inclusive. These compositions are described in U.S. Pat. No. 4,130,719. The preferred polyesters are poly(p-methylenebenzoate) and poly(m-methylenebenzoate).

The polyesters used herein have an intrinsic viscosity of at least about 0.4 to about 2.0 dl/g. measured in a 60/40 phenol/tetrachloroethane solvent at 30° C. The inherent viscosity is defined by the following relationship:

$$[\eta] = \frac{\ln n_{rel}}{C}$$

wherein $n_{rel}$ = relative viscosity, and C = the concentration in g/dl.

The polyarylates and poly(methylenebenzoates) used herein are compatible with each other in all proportions. The polyarylate is used in amounts of from about 1 to about 99 weight percent, preferably from about 5 to about 80 weight percent. The poly(methylenebenzoate) is used in amounts of from about 99 to about 1 weight percent, preferably from about 95 to 20 weight percent. The poly(methylenebenzoate) is selected from the group consisting of poly(p-methylenebenzoate), poly(m-methylenebenzoate) and mixtures thereof.

The compositions of this invention are prepared by any conventional mixing methods. For example, a preferred method comprises mixing the polyarylate and polyester in powder or granular form in an extruder and extruding the mixture into strands, chopping the strands into pellets and molding the pellets into the derived articles.

It should, of course, be obvious to those skilled in the art that other additives may be included in the present compositions. These additives include plasticizers, pigments, flame retardant additives, reinforcing agents, such as glass fibers, stabilizers and processing aids.

In order to facilitate a clear understanding of the invention, the following specific embodiments are described in detail. It should be understood, however, that the detailed expositions of the instant invention, while indicating preferred embodiments, are given by way of illustration only since various changes and modifications within the spirit and scope of the invention will become apparent to those skilled in the art from this detailed description. Blend compositions are given in weight percent, unless otherwise stated.

EXAMPLE I

PPMB was prepared according to the procedure described in U.S. Pat. No. 4,130,719 and had a 0.65 dl/g inherent viscosity in 60/40 phenol/tetrachloroethane at 30° C. The polyester was injection molded into ASTM specimens employing the conditions shown in Table I, and using an Arburg 220/E machine made by Arburg Machine Fabrik, Lossberg, West Germany.

TABLE I

| Molding Conditions-Poly(p-Methylenebenzoate) | |
|---|---|
| Zone Temperature Settings, °F. | |
| Rear | 510 |
| Front | 530 |
| Injection Cycle, sec. | 44 |
| Injection Pressure, psi. | 900 |
| Mold Temperature, °F. | 45 |

The tensile impact strength was tested according to ASTM D-1822. Tensile impact specimens were exposed in an artificial weathering unit (Weatherometer) for 280 hours by the procedures described in ASTM D-1499. After exposure, the retained tensile impact strength was only 2.5% of the initial strength.

EXAMPLE II

A polyarylate, Unitika U-1060, made by Unitika Ltd., Kyoto, Japan, prepared from Bisphenol-A and a mixture of 50 mole percent isophthalic units and 50 mole percent terephthalic units was molded using the same equipment as described in Example I. Molding conditions shown in Table II are more severe than those in Table I.

TABLE II

| Molding Conditions-Polyarylate | |
|---|---|
| Zone Temperature Settings, °F. | |
| Rear | 540 |
| Front | 620 |
| Injection Cycle, sec. | 44 |
| Injection Pressure, psi. | 1,800 |
| Mold Temperature, °F. | 195 |

EXAMPLE III

Two physical blends were prepared by mixing polyarylate and poly(p-methylenebenzoate) in specified proportions by weight in granular form and molded using an Arburg 220/E. The first blend contained 50 weight percent PPMB and 50 weight percent polyarylate (Unitika U-1060) and the second blend contained 90/10 weight percent PPMB/polyarylate. The blends were injection molded using the equipment described in Example I. Molding conditions are shown in Table III. The conditions for 50/50 weight percent PPMB/polyarylate are closer to those for PPMB than for polyarylate.

TABLE III

| Molding Conditions-Blends of PPMB and Polyarylate | | |
|---|---|---|
| | PPMB/ Polyarylate | |
| | 50/50 | 90/10 |
| Zone Temperature Settings, °F. | | |
| Rear | 520 | 510 |
| Front | 530 | 530 |
| Injection Cycle, sec. | 44 | 44 |
| Injection Pressure, psi. | 1,300 | 1,000 |
| Mold Temperature, °F. | 100 | 45 |

The molded specimens were artificially weathered as described in Example I. The excellent retention of impact properties of the blends is shown in Table IV. Polymer blend compositions are in weight percent.

TABLE IV

| Impact Properties-Blends of PPMB/Polyarylate | | | |
|---|---|---|---|
| Weatherometer Exposure (Hours) | Retention of Initial Tensile Impact Strength % | | |
| | PPMB | 90/10 PPMB/ Polyarylate | 50/50 PPMB/ Polyarylate |
| 185 | 2.5 | 82 | 88 |
| 506 | 1.3 | 84 | 102 |
| 1,006 | 0.9 | 82 | 88 |
| 2,027 | — | — | 74 |

EXAMPLE IV

To determine if the polyarylate molecular structure was the cause of the improved weatherability when the polyarylate was blended into poly(methylenebenzoate), a model compound comprising Bisphenol-A dibenzoate was prepared and blended with poly(p-methylenebenzoate) in the procedure of Example III.

Bisphenol-A dibenzoate was prepared from Bisphenol-A and benzoyl chloride by procedures known in the art. A 90/10 by weight percent blend of PPMB/Bisphenol-A dibenzoate was injection molded using the same conditions as for 90/10 weight percent PPMB/polyarylate in Example III. After 501 hours of Weatherometer exposure, the retained tensile impact strength was only 1.9% of the initial strength. This demonstrated that the model compound comprising Bisphenol-A dibenzoate did not contribute the same improved weathering characteristics as did the polyarylate.

EXAMPLE V

Blends in weight percents from 100/0 to 0/100 of PPMB and Polyarylate (Unitika U-1060) were prepared in the procedure of Example III and dissolved in 60/40 phenol/tetrachloroethane. After methanol was added to the solutions, the precipitate was filtered and dried. The glass transition temperatures (Tg) were determined using a Perkin-Elmer DSC-2 with a heating rate of 20° C./minute. All blends exhibited a single glass transition temperature (Tg) indicating formation of a miscible polymer blend. Details are given in Table V.

TABLE V

Tg's-PPMB/Polyarylate Blends

| Wt % PPMB/Polyarylate | Tg °C. |
| --- | --- |
| 100/0 | 93 |
| 90/10 | 99 |
| 75/25 | 107 |
| 50/50 | 121 |
| 25/75 | 140 |
| 10/90 | 160 |
| 0/100 | 183 |

EXAMPLE VI

The procedure of Example V was repeated using PPMB and a polycarbonate (Lexan 151), a product of General Electric, Plastics Division, Pittsfield, MA. The presence of two glass transition temperatures indicates that PPMB and polycarbonate have, at most, limited miscibility in all proportions as shown in Table VI.

TABLE VI

Tg's-PPMB/Polycarbonate Blends

| Wt % PPMB/Polycarbonate | Tg °C. |
| --- | --- |
| 100/0 | 93 |
| 90/10 | 96,140 |
| 75/25 | 97,139 |
| 50/50 | 97,138 |
| 25/75 | 98,140 |
| 10/90 | 98,143 |
| 0/100 | 149 |

EXAMPLE VII

PPMB was blended in the procedure of Example III with low levels of four conventional ultraviolet stabilizing compounds supplied by Ciba-Geigy Corporation, Plastics and Additives Div., Ardsley, N.Y., and Ethyl Corporation, Plastics Group, Richmond, Va. The five samples were exposed in an artificial weathering unit described in Example I. The retained tensile impact strength as a function of exposure time is shown in Table VII. None of the stabilizers imparted significant stability.

TABLE VII

Effect of U.V. Stabilizers on Poly(p-Methylenebenzoate)

| Stabilizer, % | Retention of Initial Tensile Impact Strength (%) Weatherometer Exposure-Hours | | |
| --- | --- | --- | --- |
| | 280 | 500 | 808 |
| CGL 234*, 1.0 | 16.5 | 17.2 | 3.3 |
| Tinuvin 622*, 1.0 | 16.1 | 16.8 | 6.3 |
| Ethyl 330**, 1.0 | 9.4 | 4.5 | 2.6 |
| Ethyl 330**, 0.5 } CGL 234*, 0.5 | 2.7 | 6.4 | 5.1 |
| Ethyl 330**, 0.5 } Tinuvin 622*, 0.5 | 5.0 | 2.4 | 2.7 |

*CIBA-Geigy Corporation product
**Ethyl Corporation product

What is claimed is:

1. A composition comprising a blend of (a) a polyarylate derived from a dihydric phenol and at least one aromatic dicarboxylic acid, ester, or acid chloride, and (b) a poly(methylenebenzoate) wherein said polyarylate is present in an amount of from about 1 to 99 weight percent and said poly(methylenebenzoate) is present in an amount of from about 99 to 1 weight percent.

2. The composition of claim 1 wherein said dihydric phenol is of the formula:

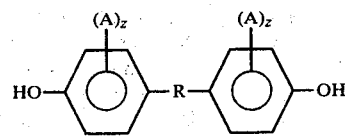

wherein A is independently selected from the group consisting of alkyl groups of 1 to 4 carbon atoms, cycloalkyl groups of 6 to 12 carbon atoms, aryl groups of 6 to 20 carbon atoms, chlorine and bromine; z is independently selected from the integers of from 0 to 4 inclusive, with the provision that when z is 0, the benzene ring is completed with a hydrogen atom; and R is a divalent saturated aliphatic or aromatic hydrocarbon radical selected from the group consisting of alkylene alkylidene radicals having from 1 to 16 carbon atoms, cycloalkylene and cycloalkylidene radicals having up to and including 9 carbon atoms, arylene radicals having from 6 to 20 carbon atoms, and two divalent hydrocarbon radicals of from 6 to 20 carbon atoms joined directly or by stable linkages selected from the group consisting of —O—, methylene, —CO—, —SO$_2$— and —S— radicals.

3. The composition of claim 2 wherein each z is zero and R is an alkylidene of 3 carbon atoms.

4. The composition of claim 1 wherein said aromatic dicarboxylic acid is selected from the group consisting of terephthalic acid, isophthalic acid, naphthalenedicarboxylic acids, and mixtures thereof.

5. The composition of claim 4 wherein said dicarboxylic acid is a mixture of from about 95 to 0 mole percent of terephthalic acid and from about 5 to 100 mole percent of isophthalic acid.

6. The composition of claim 5 wherein said dicarboxylic acid is a mixture of from about 30 to about 70 mole percent of terephthalic acid and from about 70 to 30 mole percent of isophthalic acid.

7. The composition of claim 6 wherein said dicarboxylic acid is a mixture of 50 mole percent of terephthalic acid and 50 mole percent of isophthalic acid.

8. The composition of claim 1 wherein said poly(methylenebenzoate) is of the formula:

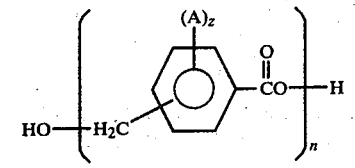

wherein n is an integer from 10 to 1000 inclusive, A is independently selected from the group consisting of alkyl groups of 1 to 4 carbon atoms, cycloalkyl groups of 6 to 12 carbon atoms, aryl groups of 6 to 20 carbon atoms, chlorine and bromine, and z is independently selected from integers of from 0 to 4 inclusive with the provision that when z is 0, the benzene ring is completed with a hydrogen atom.

9. The composition of claim 8 wherein z is 0.

10. The composition of claim 8 wherein said poly(methylenebenzoate) is selected from the group consisting of poly(p-methylenebenzoate), poly(m-methylenebenzoate) and mixtures thereof.

11. The composition of claim 1 wherein said polyarylate is derived from Bisphenol-A and an aromatic dicarboxylic acid selected from the group consisting of terephthalic acid, isophthalic acid and mixtures thereof.

12. The composition of claim 1 wherein said polyarylate is present in an amount from about 5 to about 80 weight percent and said poly(methylenebenzoate) is present in an amount of from about 95 to 20 weight percent.

13. The composition of claim 2 wherein said dihydric phenol is used in combination with a dihydric phenol of the formula:

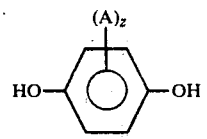

wherein A is independently selected from the group consisting of alkyl groups of 1 to 4 carbon atoms, cycloalkyl groups of 6 to 12 carbon atoms, aryl groups of 6 to 20 carbon atoms, chlorine and bromine; z is independently selected from the integers of from 0 to 4 inclusive, with the provision that when z is 0, the benzene ring is completed with a hydrogen atom.

* * * * *